United States Patent

Hunke

[11] Patent Number: 4,838,775
[45] Date of Patent: Jun. 13, 1989

[54] DEVICE FOR GRANULATING STRANDS OF THERMOPLASTIC MATERIALS

[75] Inventor: Friedrich Hunke, Grossostheim, Fed. Rep. of Germany

[73] Assignee: Automatik Apparate-Machinenbau GmbH, Grossostheim, Fed. Rep. of Germany

[21] Appl. No.: 1,396

[22] Filed: Jan. 8, 1987

[30] Foreign Application Priority Data

Jan. 10, 1986 [DE] Fed. Rep. of Germany ....... 3600567

[51] Int. Cl.[4] ................................ B29B 9/06
[52] U.S. Cl. ...................... 425/67; 264/141; 425/71; 425/308; 425/311; 425/313
[58] Field of Search ................. 425/67, 313, 316, 311, 425/DIG. 230, 71; 264/141, 178 F, 142, 22

[56] References Cited

U.S. PATENT DOCUMENTS

| | | | |
|---|---|---|---|
| 2,324,397 | 7/1943 | Hull | 264/178 F |
| 3,070,835 | 1/1963 | Alsys | 264/142 |
| 3,076,999 | 2/1963 | Washburn | 425/316 |
| 3,753,637 | 8/1973 | Gasior et al. | 425/313 |
| 3,792,950 | 2/1974 | Cuff | 425/313 |
| 3,988,085 | 10/1976 | Krchma | 425/316 |
| 4,025,252 | 5/1977 | Hunke | 425/67 |
| 4,192,635 | 3/1980 | Hunke et al. | 425/71 |
| 4,264,553 | 4/1981 | Loo | 264/142 |
| 4,269,584 | 5/1981 | Kroll et al. | 425/313 |
| 4,300,877 | 11/1981 | Andersen | 264/142 |
| 4,340,342 | 7/1982 | Kim | 425/313 |
| 4,632,752 | 12/1986 | Hunke | 425/71 |
| 4,690,788 | 9/1987 | Yada et al. | 264/22 |

Primary Examiner—Jay H. Woo
Assistant Examiner—C. Scott Bushey
Attorney, Agent, or Firm—Owen J. Meegan; Aubrey C. Brine

[57] ABSTRACT

A device for granulating strands of thermoplastic materials that are discharged molten from several nozzles side by side, with a cutter roll acting on a counterknife and a feed device filled with cooling water located prior to the cutter roll. The feed device consists of the support face of the counterknife approximately radial to the cutter roll, which essentially completely fills up the space between the nozzle surface and the cutter roll and onto which the cooling water is sprayed.

7 Claims, 1 Drawing Sheet

DEVICE FOR GRANULATING STRANDS OF THERMOPLASTIC MATERIALS

FIELD OF THE INVENTION

This invention concerns a device for granulating strands of thermoplastic materials that are discharged molten from several nozzles side by side, with a cutter roll acting on a counterknife and a feed device filled with cooling water located prior to the cutter roll.

DESCRIPTION OF THE PRIOR ART

Similar devices are disclosed by German Pat. No. 2,503,455. In this known device, the feed device consists of a discharge groove, the upper end of which is provided with a cooling water in feed and the lower end of which ends before the nip of a pair of feed rolls, beyond which is located the cutter roll with counterknife. The discharge groove can also be sprayed with cooling water. With this device, thermoplastic materials can be granulated into cylindrical granules whose viscosity can read extremely high values immediately beyond the discharge from the orifices. This universality is made possible by the discharge grooves with which desired cooling can be produced within a broad range. The mode of operation of this device is called the cold granulating process, in which the unit operations of extruding-cooling-cutting are arranged in this order (see "Granulating Thermoplastic Materials", page 139, VDI-Verlag GmbH).

Hot granulating processes are also known. The individual unit steps follow one another as follows: extruding, cutting and then cooling. A device operating by this process is disclosed by German Pat. No. 2,809,680. It is typical of this mode of procedure and accordingly typical of the device that the knives of a rotary cutter sweep across the nozzle surface under contact, with the nozzles therefore constituting the counterknife for the rotary cutter. This forms lenticular granules. In accordance with German Pat. No. 2,809,680, the rotary cutter has the form of a face-milling cutter with helical cutting edges. Since the knife in this process cuts into still molten plastic in each case, this process can only be used with a few plastics, such as polystyrene. In this process, the expense of a special cooling section between the extruder and the cutter is actually avoided but the action of the nozzles as a counterknife nevertheless requires them to have a special design, and in particular, they must be made of a hard material.

Finally, there is another type of granulating device in which there are short cooling pipes between the nozzles and the rotary knife. An example of this is the device disclosed in German Patent Application Disclosure No. 2,814,113, in which the cooling pipes have an inside diameter somewhat larger than the diameter of the strands discharged from the nozzles, with the space developed between the surface of the strands and the inner wall of the cooling pipe being filled with a jacket of cooling water flowing in the form of a cylindrical jacket. Another embodiment is disclosed in U.S. Pat. No. 3,792,950, in which the cooling pipes consist of sintered metal through which cooling water is pushed, so that a thin jacket of steam is formed between the strands passing through the pipes, which provide for the cooling of the strands and at the same time, prevents them from adhering to the inner wall of the pipes.

SUMMARY OF THE INVENTION

The basic purpose of the invention is to largely eliminate the expense for special cooling sections necessary in the past, but without thereby having to accept the limitation with regard to the scope of application with which the hot granulating devices are burdened.

This problem is solved pursuant to the invention by the fact that the feed device consists of the support face of the counterknife approximately radial to the cutter roll, which essentially completely fills up the space between the nozzle surface and the cutter roll.

It has been found, surprisingly, that to make cylindrically shaped granules for a broad range of thermoplastic materials, a cooling section is adequate that consists solely of the support face of the counterknife that is necessary anyhow for the cutter roll, which is thus utilized twice, specifically on the one hand to support the strands when passing through this particularly short cooling section, and on the other hand, to cut as the counterknife acting in concert with the cutter roll. The utilization of the support face in this manner has the further benefit that the area between the nozzle surface and the cutter roll remains readily accessible, which is not the case in cooling sections consisting of pipes. The invention thus provides a type of granulating device that operates in principle by the cold granulating process, but which can be accomplished here with minimal expense.

This principle of design, in which the counterknife is utilized in two ways, as stated above, has not previously been considered at all, and its effectiveness in a broad range of plastics must therefore be considered to be surprising.

In comparison with the hot granulating process, the use of the device pursuant to the invention also provides the important advantage that the contact between the knives and the nozzle surface necessary in the hot granulating process, which requires a particularly careful adjustment in order actually to bring about the surface contact, but on the other hand, to avoid excessive friction that would lead rapidly to overheating of the knife, is no longer necessary. In the device of the invention, no contact is necessary between the cutter roll and the counterknife, and it is also not used in the cold granulating process, since the cutter roll and counterknife encounter plastic strands already solidified on the surface that can be cut even with a slight separation between the cutter roll and counterknife. These separations are up to approximately 0.03 mm.

To fill the counterknife with cooling water, spray jets are suitably placed opposite the support face of the counterknife. The jets of cooling water directed to the support face from these spray jets enclose the strands fed across the support face in a spray mist, with the cooling water also reaching beyond the strands in an adequate manner and thus, on the one hand, preventing sticking of the strands to the counterknife, and on the other hand, producing adequate cooling of the surface of the strands.

It is also possible to bring about the filling of the counterknife with cooling water by directing a stream of cooling water onto the cutter roll, which flings the cooling water off and thereby sprays it onto the support face of the counterknife. This method can be used by itself or in combination with the spray jets. In either case, the spray of cooling water striking the counterknife is obtained, which is still desirable as long as it exerts only a cooling effect but does not lead to a deformation of the strands.

Suitably, the strands are provided with special guidance in the area of the counterknife, specifically by providing the counterknife with guide grooves for the stands. This prevents the strands from migrating laterally and thereby possibly adhering to one another. The guide grooves also provide cooling water baths for the strands, which benefits the intensity of the cooling.

DESCRIPTION OF THE PREFERRED EMBODIMENTS

Figure 1:
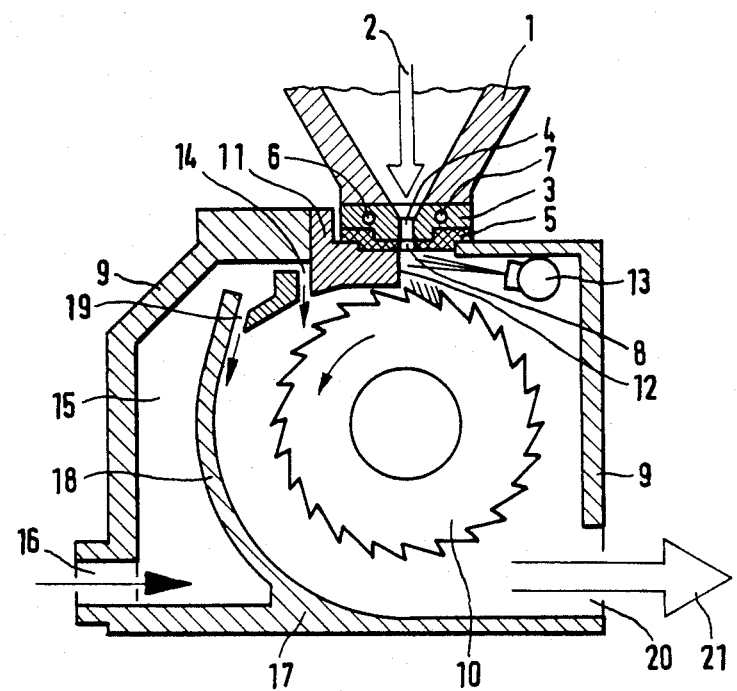
Figure 2:
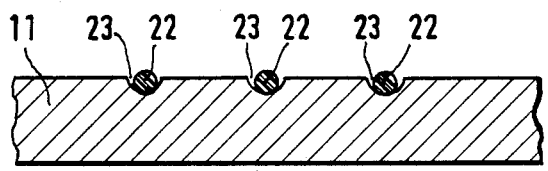

An example of embodiment is illustrated in the Figures. The Figures show:

FIG. 1—the device shown in principle in cross section,

FIG. 2—a counterknife with guide grooves and strands of plastic guided by them.

FIG. 1 shows the feed hooper 1 feeding liquid plastic, which runs through the feed hopper 1 in the direction of the arrow 2. The feed hopper 1 at its bottom has the nozzle plate 3, which contains a number of orifices side by side, of which only the orifice 4 is visible here. The orifices in the nozzle plate 3 according to the illustration in FIG. 1 are therefore behind one another in the direction of view. The nozzle plate 3 has insulation 5 on its bottom shown cross-hatched, which provides that only a small amount of heat can be withdrawn from the nozzle plate by the components located below it. To maintain an adequate temperature of the nozzle plate 3, the heating elements 6 and 7 are located in it. The insulation 5 has an opening 8 expanded opposite the orifice 4, so that molten plastic passing through the orifice 4 can not adhere to the insulation 5.

The feed hopper 1 with the nozzle plate 3 and the insulation 5 rests on the housing 9, which surrounds the components necessary for the granulation. These consist of the cutter roll 10 and the counterknife 11, which in this case, is recessed in the wall of the housing 9. The strands discharged from the orifices 4 pass through the opening 8 in the insulation 5 and run across the support face 12 of the counterknife 11 until they reach the cutter roll 10, by which they are then cut up in a known way into granules.

The spray jet 13 is located in the housing 9 opposite the support face 12 of the counterknife 11 and sprays cooling water onto the support face, by which the plastic strands fed across the support face 12 are cooled. A mist of cooling water is produced by spraying the cooling water in front of the support face 12, which surrounds the strands on all sides, and cools them, without leading to their deformation.

The cooling section thus formed by the support face of the counterknife, which, in this case, completely fills the space between the surface of the insulation 5 and the cutter roll 10, is approximately 10 mm long. This length is sufficient to solidify the plastic strands on their surface to such an extent that they can be cut up into granules by the cutter roll without sticking to one another, which is also prevented by the cooling water that escapes through the opening 14 and is directed onto the cutter roll. This will be discussed in detail below. The length of the cooling section formed by the support face 12 can be approximately 5–30 mm.

The water tank 15 to which the water is fed through the inlet opening 16, is incorporated into the housing 9. The water tank is formed essentially by the bottom 17 of the housing 9, the adjoining wall of the housing 9 at the inlet opening 16, and the inner wall 18. In the water tank 15, the water rises and reaches the slot 19 and the opening 14, from which it is fed to the cutter roll 10. The cooling water escaping from the slot 19 flows away on the side of the inner wall 18 facing the cutter roll 10, is then fed across the bottom 17 and is discharged together with the granules from the outlet 20 in the direction of the arrow 21. The cooling water fed across the inner wall 18 and the bottom 17 floats the granules produced out of the housing 9 in this way.

The cooling water fed to the cutter roll 10 through the opening 14 is entrained turbulently by the cutter roll 10 and is flung away from it, with a substantial portion of this water being sprayed onto the support face 12 of the counterknife 11, which is indicated by the lines drawn in front of the support face 12. In this way, therefore, the support face 12 is also sprayed with cooling water by the cutter roll 10. Depending on the requirement for cooling, either the spray jet 13 or the spraying from the cooling water flung off by the cutter roll 10 can be used, but it is naturally also possible to provide both methods of spraying at the same time.

FIG. 2 shows a cross section through the counterknife 11, that is provided in this case with guide grooves 23 on its side facing the strands 22, by which the strands 22 are guided so that they can not migrate laterally in this area between the orifice 4 and the cutter roll 10.

I claim:

1. A device for granulating strands of thermoplastic materials that are discharged from nozzle means in the molten state, said device comprising:

hopper means arranged to contain molten thermoplastic material;

an array of nozzle means disposed side by side and arranged to receive said thermoplastic materials from said hopper means and to extrude strands of said thermoplastic materials in a molten state therefrom;

a granulating device comprising a cutter roll and a counterknife, said cutter roll acting on said counterknife to granulate the extruded strands of thermoplastic materials, said counterknife further being disposed approximately radially to said cutter roll;

said granulating device further comprising a support face disposed on said counterknife, said support face on said counterknife being disposed for supporting said strands located between said nozzles and said cutter roll, said counterknife further filling essentially completely the space between the nozzles and the cutter roll; and means for spraying cooling water onto said counterknife to harden said strands of thermoplastic material prior to contact with said cutter roll.

2. The device according to claim 1 wherein said means for spraying cooling water are spray nozzles, said spray nozzles being disposed opposite said support face of said counterknife.

3. The device according to claim 1 wherein said means for spraying cooling water are spray nozzles, said spray nozzles being disposed so that streams of cooling water are directed at the cutter roll, whereby said cutter roll flings the cooling water off and sprays it onto the support face of the counterknife.

4. The device according to claim 2 wherein said means for spraying cooling water are spray nozzles, said spray nozzles being disposed so that the streams of cooling water are directed at the cutter roll, whereby said cutter roll flings the cooling water off and thus sprays it onto the support face of the counterknife.

5. The device according to claims 1, 2, 3 or 4 further including guide grooves for feeding the strands disposed on the counterknife support face.

6. A device for granulating strands of thermoplastic materials that are discharged in the molten state from nozzles, said device comprising:

hopper means arranged to contain molten thermoplastic material, said hopper means narrowing to a throat at a discharge end thereof;

an array of nozzle means disposed side by side at the discharge end of said throat and arranged to receive said molten thermoplastic materials from said hopper means and to extrude strands of said thermoplastic materials in a molten state therefrom;

a granulating device comprising a cutter roll and a counterknife, said cutter roll acting on said counterknife to granulate the extruded strands of thermoplastic materials, said counterknife further being disposed approximately radially to said cutter roll;

said granulating device further comprising a support face disposed on said counterknife, said support face on said counterknife being disposed for supporting said strands located between said nozzles and said cutter roll, said counterknife further filling essentially completely the space between the nozzles and the cutter roll;

insulating means disposed between said nozzles and said counterknife whereby to maintain said thermoplastic material in the molten state in said nozzles; and means for spraying cooling water onto said counterknife whereby to harden said strands of thermoplastic material prior to contact with said cutter roll.

7. The device according to claim 6 further including heating means to keep said thermoplastic materials in a molten state disposed adjacent to said nozzle means.

* * * * *